(No Model.)
C. L. HAUBEIL.
FENDER FOR WAGON BODIES.
No. 304,524. Patented Sept. 2, 1884.
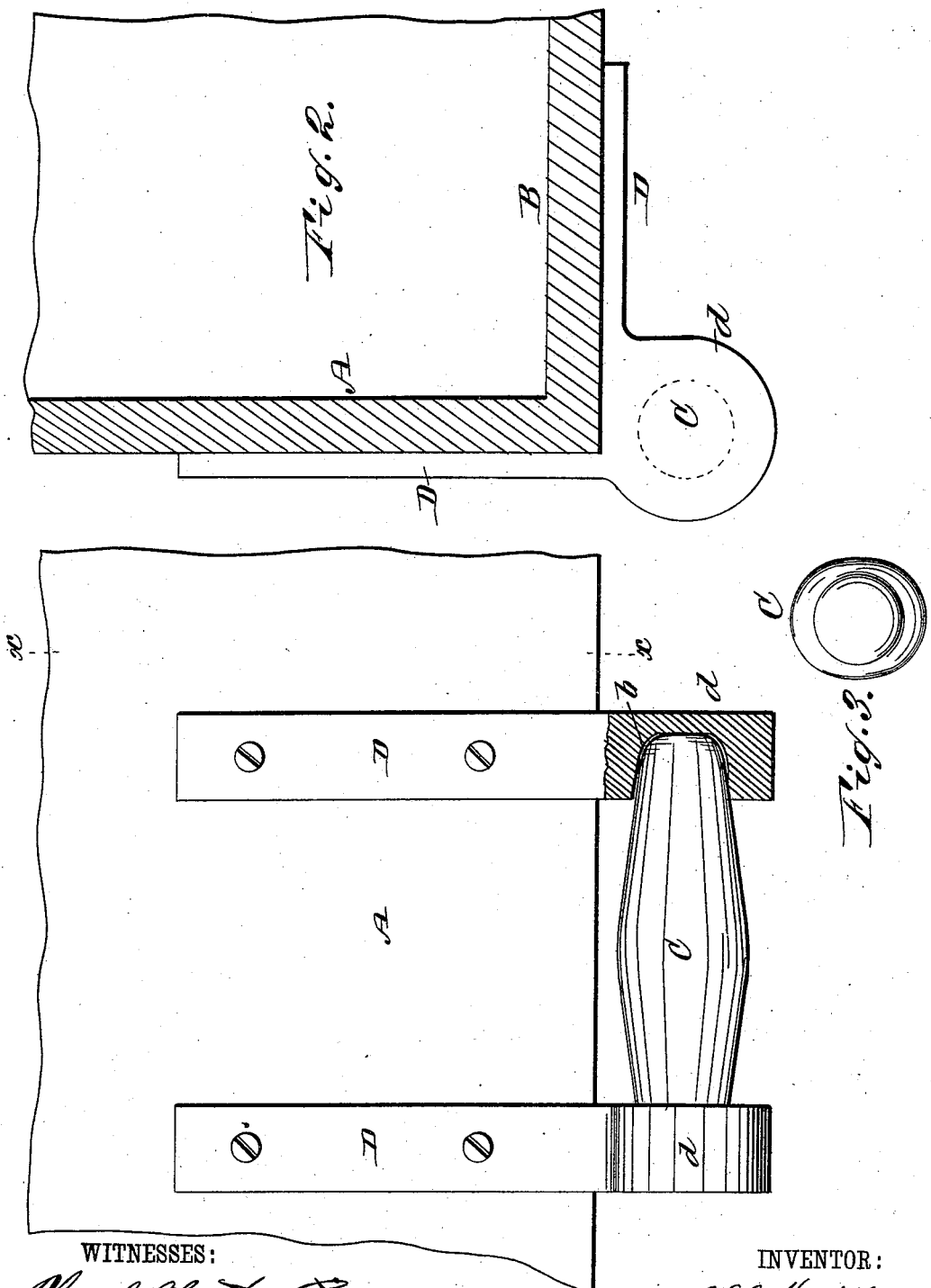
WITNESSES:
INVENTOR:
C. L. Haubeil
BY Munn & Co
ATTORNEYS.

UNITED STATES PATENT OFFICE.

CHRISTIAN L. HAUBEIL, OF WAVERLY, OHIO.

FENDER FOR WAGON-BODIES.

SPECIFICATION forming part of Letters Patent No. 304,524, dated September 2, 1884.

Application filed May 22, 1884. (No model.)

*To all whom it may concern:*

Be it known that I, CHRISTIAN L. HAUBEIL, of Waverly, in the county of Pike and State of Ohio, have invented a new and Improved Roller-Fender for Wagons and other Draft-Vehicles, of which the following is a full, clear, and exact description.

This invention relates to guards or chafing-irons for wagons and other wheel-vehicles in which rollers arranged to project on or from the body of the vehicle are used to prevent the wheels, when turning the vehicle, from chafing the body, and from meeting with an immediate and unyielding resistance, which, interfering with the rotation of the wheels, has a tendency to overturn the vehicle; and my invention consists in a novel construction of said rollers and method of supporting or carrying them, whereby a more effective roller action is obtained and the body of the vehicle is stiffened or strengthened.

Reference is to be had to the accompanying drawings, forming a part of this specification, in which similar letters of reference indicate corresponding parts in all the figures.

Figure 1 represents a side view of the body of a wagon in part with my invention applied; Fig. 2, a transverse vertical section of the same in part on the line $x\,x$ in Fig. 1, and Fig. 3 an end view of the roller detached.

A indicates one side, and B the bottom, of a wagon body or bed. C is the roller-fender against which the wheel strikes in turning the vehicle, and which is arranged wholly under instead of wholly on one side of the bed. This roller, which may be more or less oval, is of convex form, or of reverse tapering construction in direction of its length, with its greatest diameter in or about the center thereof, whereby it is more readily turned as the wheel strikes and slides over it than if it were straight or concave in direction of its length, as such rollers have heretofore been constructed. Furthermore, I dispense with all spindle-support for said roller and simply round or form its reduced ends to work freely in sockets $b$, made in lugs $d$ of or on angular clamps D, constructed to similarly brace both the sides and bottom of the bed portion of the wagon, and that materially serve to stiffen the wagon body or bed.

Having thus described my invention, I claim as new and desire to secure by Letters Patent—

1. In a roller-fender for wagons and other wheel-vehicles, the roller made of diminishing diameter and reverse taper toward its opposite ends, substantially as specified.

2. The combination, with the angular clamps D, constructed with lugs $d$, having sockets $b$, for arrangement in relation with the bed or body of the vehicle, as described, of the roller C, arranged to project wholly below said body and of reverse tapering construction in direction of its length, diminishing toward its opposite ends, and shaped at its ends to freely turn within said sockets, essentially as and for the purposes herein set forth.

CHRISTIAN L. HAUBEIL.

Witnesses:
JOSEPH J. EMMETT,
SIDNEY A. STEDMAN.